United States Patent [19]
Joubert

[11] Patent Number: 4,587,113
[45] Date of Patent: May 6, 1986

[54] REMOVAL OF SULFUR AND NITROGEN CONTAINING POLLUTANTS FROM DISCHARGE GASES

[75] Inventor: James I. Joubert, Pittsburgh, Pa.

[73] Assignee: The United States of America as represented by the United States Department of Energy, Washington, D.C.

[21] Appl. No.: 699,889

[22] Filed: Feb. 8, 1985

[51] Int. Cl.$^4$ .......................... B01J 8/00; C01B 17/00; C01B 21/00
[52] U.S. Cl. ...................................... 423/244; 423/239
[58] Field of Search .......... 423/242 A, 242 R, 244 A, 423/244 R, 239; 252/189, 190

[56] References Cited

U.S. PATENT DOCUMENTS

| | | | |
|---|---|---|---|
| 3,630,943 | 12/1971 | Myers et al. | 252/190 |
| 4,170,627 | 10/1979 | Ginger | 423/239 |
| 4,192,855 | 5/1980 | Ginger | 423/239 |
| 4,246,081 | 1/1981 | Winnick | 204/130 |
| 4,442,078 | 4/1984 | Jalan et al. | 423/230 |
| 4,455,286 | 6/1984 | Young et al. | 423/244 |

FOREIGN PATENT DOCUMENTS 1160662  8/1969  United Kingdom ............... 423/244

OTHER PUBLICATIONS

Quarterly Report, U.S. Department of Energy, 1984.
Lowell et al., "Selection of Metal Oxides for Removing $SO_2$ from Flue Gas, Ind. Eng. Chem.–Process Design Development, vol. 10, No. 3, 1971.

Primary Examiner—Gregory A. Heller
Attorney, Agent, or Firm—Hugh W. Glenn; Paul A. Gottlieb; Judson R. Hightower

[57] ABSTRACT

Oxides of sulfur and of nitrogen are removed from waste gases by reaction with an unsupported copper oxide powder to form copper sulfate. The resulting copper sulfate is dissolved in water to effect separation from insoluble mineral ash and dried to form solid copper sulfate pentahydrate. This solid sulfate is thermally decomposed to finely divided copper oxide powder with high specific surface area. The copper oxide powder is recycled into contact with the waste gases requiring cleanup. A reducing gas can be introduced to convert the oxide of nitrogen pollutants to nitrogen.

13 Claims, 2 Drawing Figures 4,587,113

REMOVAL OF SULFUR AND NITROGEN CONTAINING POLLUTANTS FROM DISCHARGE GASES

CONTRACTUAL ORIGIN OF THE INVENTION

The U.S. Government has rights in this invention pursuant to the employer-employee relationship of the inventor to the U.S. Department of Energy at the Pittsburgh Energy Technology Center.

BACKGROUND OF THE INVENTION

The present invention relates to the removal of sulfur and nitrogen containing pollutants from waste gases. These pollutants are often present in the discharge gases of fossil fuel fired boilers or furnaces for industrial applications.

Previous methods for removing sulfur containing pollutants from gas streams have included such as scrubbing with large volumes of liquid solutions containing alkaline minerals, organic bases or alcohols. Such processes require substantial expenditures for large capacity scrubbing equipment and are of considerable disadvantage for use in combination with high temperature processes.

Other methods for removing sulfur oxides or hydrogen sulfide have included electrochemical separation as shown in U.S. Pat. No. 4,246,081, Jan. 20, 1981 to Winnick. The process requires the use of costly electric energy in an electrochemical apparatus to effect the separation.

U.S. Pat. Nos. 4,455,286, June 19, 1984 and 4,442,078, April 10, 1984 disclose methods for removing hydrogen sulfide and other sulfur containing gases from gas mixtures. These patents teach that copper oxide should be supported on a substrate such as zinc oxide when used to remove hydrogen sulfide from a hot fuel gas stream.

SUMMARY OF THE INVENTION

Therefore in view of the above it is an object of the present invention to provide a method for removing sulfur containing gases with an unsupported oxide of copper.

It is a further object to provide such a method in which nitrogen oxides may be decomposed while sulfur oxides are removed.

It is a further object to provide for sulfur oxide and nitrogen oxide removal directly in the discharge gas channels of a combustion process without the use of substantial additional sorbent-gas contacting equipment.

It is also an object to provide a process for the removal of sulfur containing gases in which the regeneration of the sorbent enhances its capability for capturing pollutants.

In accordance with the present invention, a process for the removal of sulfur oxides from a discharge flue gas is provided. The discharge gas is contacted with an unsupported oxide of copper powder to react with oxides of sulfur and form a sulfate of copper. The presence of the sulfated copper in contact with the flue gas enhances the decomposition of nitrogen oxide pollutants. The powder is separated from the gas by filtering and is contacted with aqueous solvent to dissolve sulfates of copper into solution. The resulting solution is sprayed dried to form fine particles including a sulfated copper that can be heated to a sufficient temperature at which it decomposes to form a fine, unsupported oxide of copper powder and an oxide of sulfur gas. The finely dispersed oxide of copper powder is recycled into contact with the discharge flue gases.

One other aspect of the invention is useful when the copper powder is only partially converted to the sulfate. This incompletely sulfated powder is contacted with an oxide of sulfur gas to convert substantially all of the oxide to sulfate of copper prior to dissolution in aqueous solvent. The oxide of sulfur gas is conveniently provided from the copper sulfate decomposition step of the process.

In other aspects of the invention, a reducing gas such as ammonia, carbon monoxide or hydrogen is added into the discharge gas along with the oxide of copper powder to effect reduction or decomposition of nitrogen oxides to form nitrogen gas.

One other aspect of the invention involves entraining the unsupported oxide of copper powder within a flow of discharge gas to effect intimate contact between the pollutant containing gas and the finely dispersed unsupported copper oxide.

The present invention also contemplates a process for removing sulfur and nitrogen containing pollutants from a combustion gas in which the combustion gas is contacted with entrained particles of unsupported copper oxide. The entrained particles have an average diameter of less than 30 microns and a specific surface area of more than 25 meters square per gram.

In other aspects of this process, ash particles in the combustion gas are separated from the spent oxide of copper particles following filtration by dissolving the sulfate particles in aqueous solvent and effecting a solid liquid separation to remove the water-insoluble ash component.

DETAILED DESCRIPTION OF THE DRAWING

The present invention is illustrated in the accompanying drawing wherein.

DETAILED DESCRIPTION OF THE PREFERRED EMBODIMENT

Figure 1:
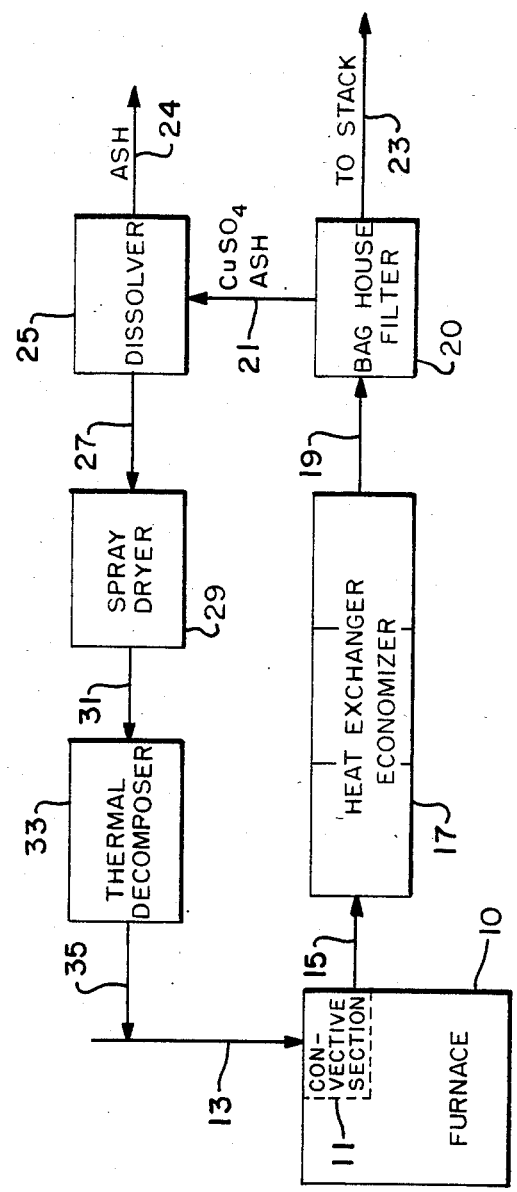
FIG. 1 is a diagrammatic flow diagram illustrating the use of entrained oxide of copper powder to remove sulfur and nitrogen containing pollutants from a discharge gas.

In FIG. 1 the process of the present invention is illustrated in connection with the discharge gas from a conventional boiler or furnace 10 for the generation of steam or other extraction of useful energy. The convective section 11 of the boiler furnace 10 is the preferred location for the introduction of unsupported and finely divided oxide of copper powder 13. Typically such a convective section would receive combustion gases at 800°–1200° C. and contain a high gas flow to transfer heat to the boiler tubes.

At this point in the process, a finely divided oxide of copper powder is conveniently entrained in the gas flow to begin reaction with sulfur containing pollutants and form sulfate of copper compounds. These compounds, such as $CuSO_4$, catalytically promote the decomposition of the various nitrogen oxides to innocuous products. To assist in the decomposition of the oxides of nitrogen, reducing gases such as ammonia, carbon monoxide, or hydrogen may be introduced with the oxide of copper powder at 13. Thus, the reduction of the nitrogen oxides to elemental nitrogen gas ($N_2$) is promoted.

It is the entrainment of the finely divided particles containing sulfates and oxides of copper that permit good contact and reaction to decompose or remove the nitrogen oxides and sulfur containing pollutants. The various oxides of copper, for example CuO and $Cu_2O$ are contemplated for use.

Sulfates of copper are formed from reaction of the copper oxides with sulfur oxide pollutants. The species CuO is typically formed from the decomposition of $CuSO_4$ and is the preferred selection for the present process. The presence of the finely divided $CuSO_4$ aids in the decomposition or reduction of the nitrogen oxides.

The discharge flue gas of a combustion furnace ordinarily will contain oxides of sulfur such as sulfur dioxide, and sulfur trioxide. In other processes, discharge gases may contain other sulfur containing pollutants such as hydrogen sulfide. It will be clear that the present process with suitable modifications can be used to remove these pollutants as well. Where hydrogen sulfide is present, it will react with oxides of copper to form copper sulfide which can be oxidized to copper sulfate by reaction with hot air or other oxygen containing gases in the subsequent steps of the process.

The gases 15 leaving the convective section of the furnace are expected to include some sulfate of copper in mixture with the entrained copper oxide powder. Further reaction and pollutant removal can occur within the economizer heat exchanger 17 as the gases are cooled to temperatures at which copper sulfate is more stable.

Typically, the gases are discharged from furnace convection section 11 at about 500°–600° C. and are cooled to about 100°–200° C. in heat exchanger 17. The heat removed can be employed for useful purposes such as preheating air to the furnace 10.

The gases 19 with entrained, finely divided solids including oxides of copper, sulfates of copper and ash are passed through a conventional bag house filter 20 for separating the solids 21 from the waste gases 23. Filter 20 is a conventional device for removing dust sized particles from a gas flow. Particles approaching a few microns diameter can be removed from the gas flow and recycled in the process.

The powdered mixture may include residual copper oxide as well as copper sulfate and ash. If substantial oxides of copper remain unreacted, further processing must be performed as will be described below to prevent loss of insoluble copper oxide with the discarded ash. Otherwise, a solids mixture of copper sulfate and ash 21 is introduced into dissolver 25.

Dissolver 25 includes a vessel for contacting the particulate solids with aqueous solvent to dissolve the copper sulfate into solution. Typically hot water is used as the aqueous solvent however, other aqueous based solvents that include organics or promoting agents are also contemplated for use. Also, a solids-liquid separation means such as a settler or centrifuge is required to remove the solid ash stream 24 from the copper sulfate solution 27. Any unreactive oxide of copper remaining in the solids mixture will not be dissolved in the hot aqueous solution and thus require an additional sulfation step as will be discussed below.

Copper sulfate, $CuSO_4$ and copper sulfate pentahydrate $CuSO_4.5H_2O$ are readily soluble in hot water, e.g. 50°–150° C., and thus, are separated from the insoluble ash components.

The aqueous solution containing copper sulfate 27 is dried such as in a spray dryer 29 to form copper sulfate pentahydrate ($CuSO_4.5H_2O$). The spray drying provides the hydrated sulfate in a finely divided powdered form which can be heated in thermal decomposer 33 to convert copper sulfate or copper sulfate pentahydrate to finely divided oxides of copper. Temperatures of about 600°–900° C. in such as a tumble drier can be used as Thermal Decomposer 33. The regenerated oxide of copper powder 35 can be returned to furnace 10 for recycle through the process.

Figure 2:
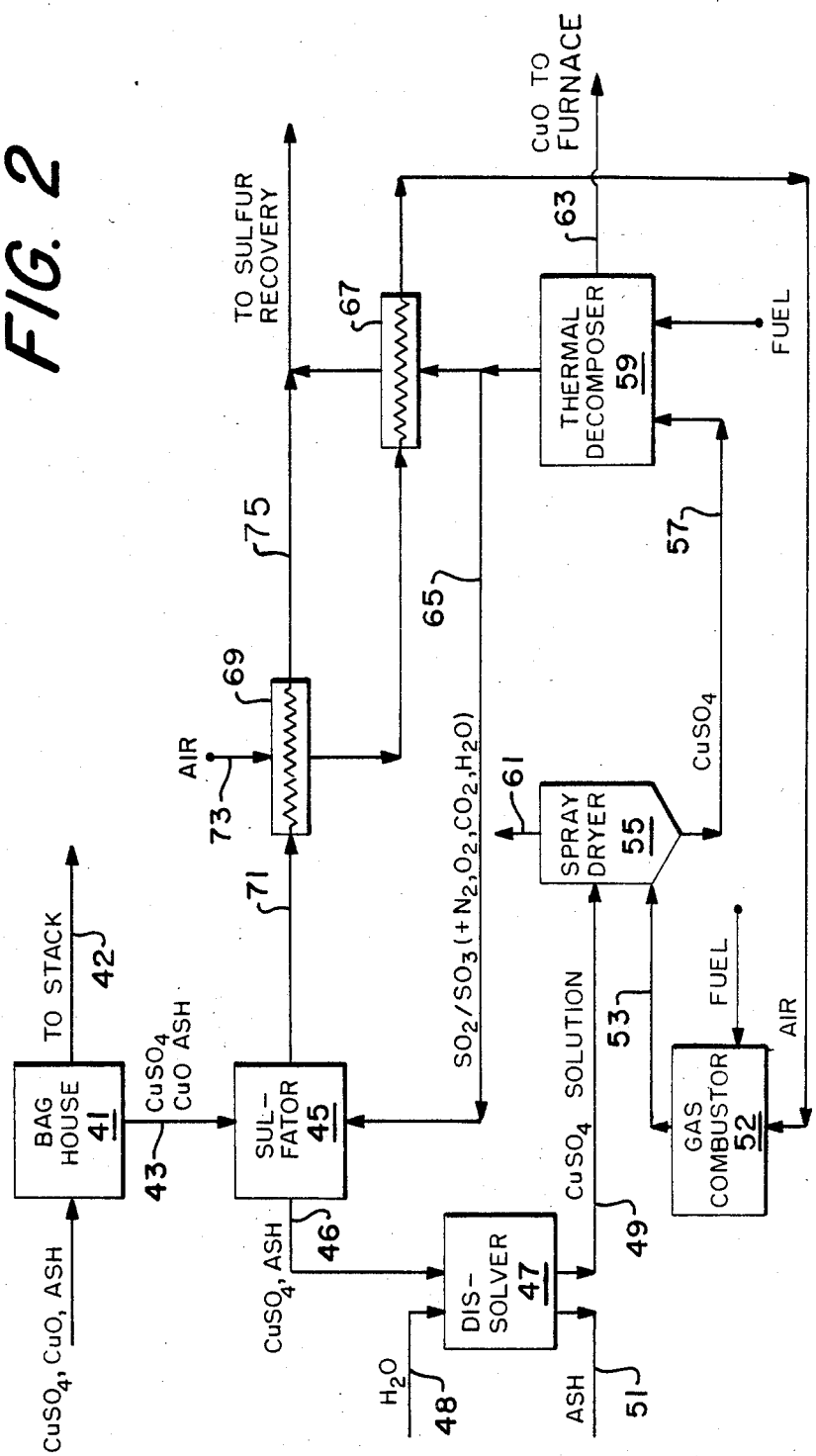
FIG. 2 is a diagrammatic illustration of a sorbent regeneration process.

Additional details of the entrained copper oxide process are illustrated in FIG. 2, particularly in respect to the oxide sorbent regeneration. The solids 43 separated from the gas flow in bag house filter 41 are introduced into a reactor 45 in which substantially all of the oxide of copper is sulfated to $CuSO_4$. Sulfator 45 can be a fluidized or fixed bed reactor in which a gas containing a high concentration of oxides of sulfur such as $SO_2$ or $SO_3$ is passed into contact with the unreacted particles containing oxides of copper. The sulfation reaction is effectively performed at about 300°–500° C. Accordingly, it is advantageous to operate the bag-house filtering operation at 41 at as high a temperature as possible to minimize or eliminate any need to cool and reheat the solids removed from the gas flow. However, any required reheating can be accomplished by heat transfer from the gas flow.

The fully sulfated copper powder 46 with ash is then conveyed to the dissolver 47 where the $CuSO_4$ solution 49 can be separated from the ash 51. The aqueous solution 49 is passed into contact with a hot gas flow 53 from combustor 52 as it is sprayed into a spray dryer 55 to form finely divided copper sulfate pentahydrate 57. The gas flow through the spray dryer 55 including generated steam can be used to convey the powdered sulfate of copper to the thermal decomposer 59. Alternatively, a portion of the gas may be vented as illustrated at 61 to reduce the gas flow volume.

Thermal Decomposer 59 is operated at a temperature of about 600°–900° C. to decompose the copper sulfate to finely divided oxide of copper 63 for return into contact with discharge gases to be cleaned of sulfur or nitrogen containing pollutants. Advantageously, finely divided, unsupported particles of CuO are formed with an average particle size of less than 30 microns diameter and a specific surface area of more than 25 meters square per gram.

The gases from the Thermal Decomposer 59 rich in oxides of sulfur such as $SO_2$ and $SO_3$ can be used for recycle 65 into the sulfator 45 and for preheating the flow of air for the process such as in heat exchanger 67. An additional economizing heat exchanger 69 can use the discharge gas 71 from the sulfator 45 to heat air flow 73 for the system such as used in combustor 52. The combined sulfur rich discharged gases 75 can be passed to a conventional sulfur recovery process.

The process of the invention can be used to remove oxides of sulfur from the discharge waste gases of combustion processes. In particular, sulfur dioxide and sulfur trioxide may be removed. In addition, other sulfur containing pollutants such as hydrogen sulfide can be processed from waste gases with additional reaction with air to convert the spent sorbent to copper sulfate in the process of the invention. The presence of copper sulfate aids in the reduction or the decomposition of nitrogen oxide pollutants to more innocuous forms as a secondary but important advantage of their process.

The use of finely divided and unsupported oxide of copper sorbent permits its injection directly in the process channels discharging pollutant containing gases. This eliminates or minimizes the use of additional sorbent-gas contacting equipment. The sorbent regeneration process described herein provides an advantageous form of finely divided copper oxide sorbent for this purpose.

Although the present invention is described in terms of particular materials and process steps, it will be clear to one skilled in the art that various modification can be made within the scope of the claims.

The embodiments of this invention in which an exclusive property or privilege is claimed are defined as follows:

1. A process for the removal of sulfur oxide-containing pollutants from a gas flow including entrained ash comprising:
   entraining finely divided, unsupported oxide of copper powder in said gas flow to react with the sulfur oxide containing pollutants and form a sulfate of copper in mixture within the powder, said finely divided oxide of copper powder having an average particle size of less than 30 microns;
   separating said powder and ash from said gas;
   contacting said powder and ash with oxide of sulfur gas to sulfate substantially all of the oxide of copper in said powder;
   contacting said sulfated powder and ash with aqueous solvent to dissolve said sulfate of copper into solution while ash remains as solid;
   separating the liquid solution containing sulfate of copper from the solid ash;
   spray drying said liquid solution to form fine particles including a sulfate of copper;
   heating the sulfate of copper particles to a sufficient temperature to decompose said sulfate of copper to a finely divided oxide of copper powder and an oxide of sulfur gas;
   returning said finely divided oxide of copper powder into contact with said gas flow; and
   recycling a portion of said oxide of sulfur gas into contact with said powder and ash.

2. The process of claim 1 wherein said powder in contact with said gas consists essentially of copper containing compounds including oxide or sulfate of copper substantially in the absence of a solid support material.

3. The process of claim 1 wherein said oxide of copper includes CuO and said sulfate of copper includes $CuSO_4$.

4. The process of claim 1 wherein said pollutant-containing gas is contacted with said oxide of copper powder at a temperature of 800°–1200° C. and the resulting gas-solid mixture cooled to 100°–200° C. followed by filtering to effect separation of the powder and ash from the gas.

5. The process of claim 1 wherein the pollutant-containing gas includes an oxide of nitrogen and a reducing gas is added to the gas in contact with oxide and sulfate of copper to reduce the oxide of nitrogen to elemental nitrogen.

6. The process of claim 5 wherein the reducing gas is selected from the group consisting of ammonia, carbon monoxide and hydrogen.

7. The process of claim 1 wherein the sulfate of copper is decomposed to CuO and the oxide of sulfur gas at a temperature of 600°–900° C.

8. The process of claim 1 wherein the oxide of copper powder is entrained within a gas flow containing oxides of sulfur and oxides of nitrogen to effect intimate contact therewith.

9. The process of claim 1 wherein the pollutant-containing gas flow includes an entrained water-insoluble solid, and the entrained solid is separated from the copper sulfate solution by solid-liquid separation with substantially all the copper sulfate carried in the liquid phase.

10. The process of claim 1 wherein the oxide of copper powder consists essentially of unsupported particles with a specific surface of more than 25 meters square per gram.

11. A process for removing oxides of sulfur and oxides of nitrogen from a pollutant-containing gas flow comprising, contacting the gas flow with entrained particles of unsupported oxide of copper, said particles having an average diameter of less than 30 microns and a specific surface area of more than 25 meters square per gram wherein the pollutant-containing gas flow includes entrained water-soluble ash particles and wherein sulfate of copper is formed by reaction of the oxides of sulfur with the oxide of copper, the ash particles in mixture with particles containing sulfate of copper are separated by filtration from the gas flow, the water-insoluble ash particles are separated from the sulfate of copper by a solid-liquid separation following dissolution of the sulfate in aqueous solution.

12. The process of claim 11 wherein the oxide of copper particles are formed by the thermal decomposition of copper sulfate pentahydrate.

13. The process of claim 11 wherein the aqueous solution of sulfate is dried to copper sulfate pentahydrate and the copper sulfate pentahydrate is thermally decomposed to a finely divided oxide of copper for recycle into entrained contact with the pollutant-containing gas.

* * * * *